United States Patent [19]

Bilobran

[11] 4,054,278
[45] Oct. 18, 1977

[54] LEAF SPRING ASSEMBLY

[75] Inventor: John Bilobran, Birmingham, Mich.

[73] Assignee: General Motors Corporation, Detroit, Mich.

[21] Appl. No.: 706,624

[22] Filed: July 19, 1976

[51] Int. Cl.² ............................................. F16F 1/22
[52] U.S. Cl. ........................................ 267/47; 29/173
[58] Field of Search .............. 267/47, 48, 49; 29/173

[56] References Cited

U.S. PATENT DOCUMENTS

| 1,199,013 | 9/1916 | Landau | 267/47 |
| 3,869,142 | 3/1975 | Radamaker | 267/47 |

Primary Examiner—James B. Marbert
Attorney, Agent, or Firm—John P. Moran

[57] ABSTRACT

A leaf spring assembly in which the leaves, except for the longest or spring-eye leaf, the leaf adjacent thereto, and the shortest leaf, are formed from bar stock by cutting same with an ogee or sloped S-shaped die section without producing any resultant scrap; cambering and heat treating the individual leaves in the conventional manner; and assembling same such that each successive leaf is shorter than the predecessor leaf and its ogee-shaped end is mounted in the oppositely disposed attitude relative to the predecessor leaf, with substantially full length contact therebetween, without providing for conventional tip inserts or leaf separators therebetween.

5 Claims, 4 Drawing Figures

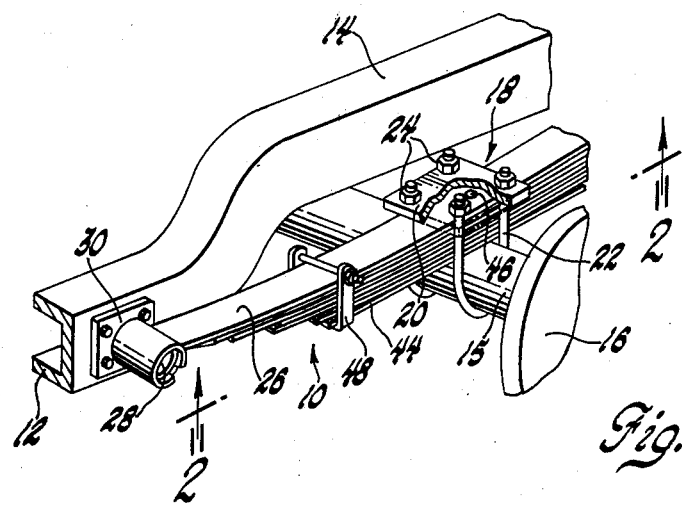
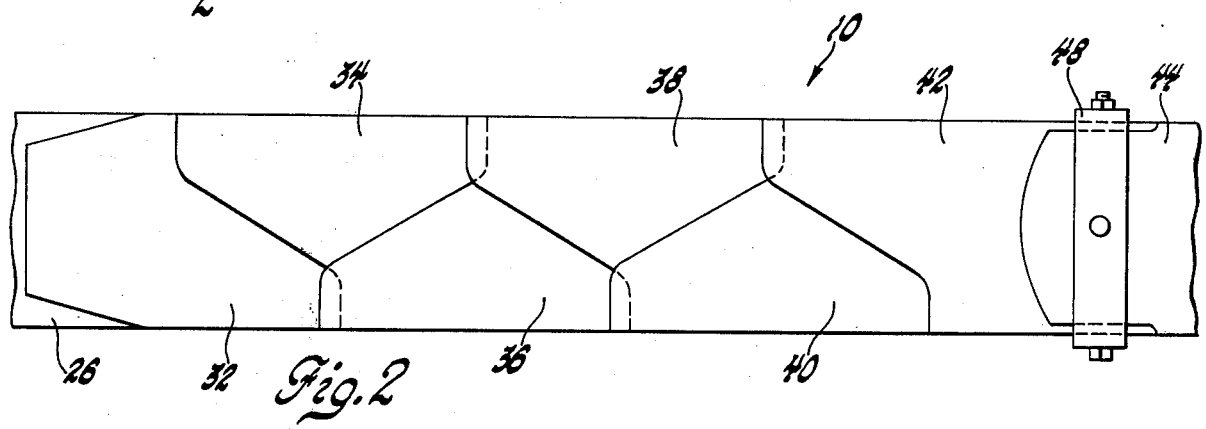
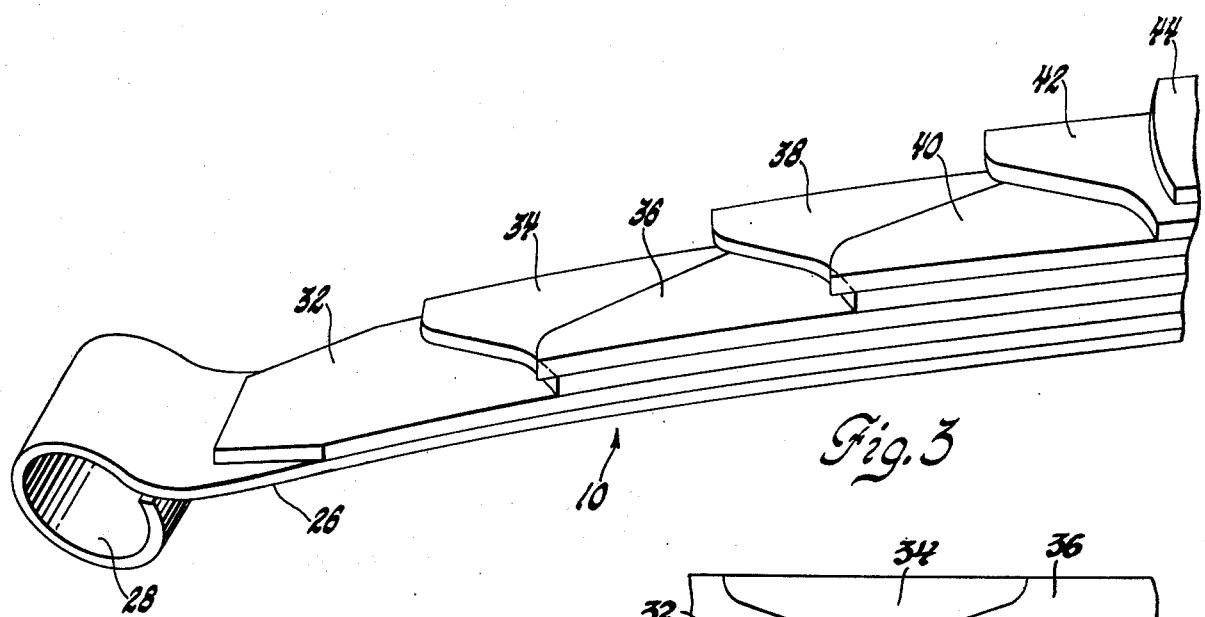
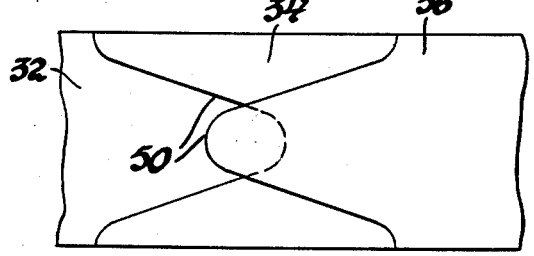

LEAF SPRING ASSEMBLY

This invention relates generally to suspension systems for motor vehicles and, more particularly, to leaf spring assemblies.

Heretofore, it has been common practice to pierce the end portions of leaf spring leaves and/or to point roll same for the mounting thereon of so-called tip inserts or separators, and for such leaf ends to be formed in a "cut-off V" or diamond-cropped shape, such characteristics being shown and described, for example, in Churchill U.S. Pat. No. 2,621,921, issued on Dec. 16, 1952.

It is an object of this invention to provide an improved leaf spring assembly wherein (1) the piercing and rolling operations, (2) the need for inserts or spacers, and (3) the scrap resulting from diamond cropping, are all eliminated.

Another object of the invention is to provide a leaf spring assembly wherein individual leaves have an ogee or sloped S-shaped end profile and are stacked such that the ogee-shaped end of each successive shorter leaf is oppositely disposed with respect to the preceding leaf.

A further object of the invention is to provide a method of manufacturing a leaf spring assembly, including the steps of cutting bar stock into a predetermined number of individual length leaves having ogee-shaped end profiles, and assembling the leaves such that each successive leaf is shorter than the underlying leaf and its ogee-shaped end is mounted in the oppositely disposed attitude relative to the underlying leaf, and such that the leaves are urged into substantially full length contact with one another.

These and other objects and advantages of the invention will be apparent when reference is made to the following description and accompanying drawings, wherein:

FIG. 1 is a fragmentary perspective view of a vehicular frame side rail and associated wheel and axle arrangement embodying the inventive leaf spring suspension system;

FIG. 2 is an enlarged fragmentary view taken along the plane of the line 2—2 of FIG. 1, and looking in the direction of the arrows;

FIG. 3 is an enlarged fragmentary perspective view of a portion of FIG. 1; and

FIG. 4 is a fragmentary plan view of an alternate embodiment.

Referring now to the drawings in greater detail, FIG. 1 illustrates one of a pair of oppositely disposed leaf spring assemblies 10 for use on vehicles having the usual frame side rail 12, with an upwardly cambered or bowed portion 14 traversing over the rear axle 15. Conventional wheels 16 are mounted on opposite ends of the axle 15.

More specifically, each leaf spring assembly 10 is securely confined at an intermediate point therealong against the axle 15 by clamping means 18 consisting of a plate 20 and oppositely disposed U-bolts 22 and nuts 24, intermediate each side rail 12 and each adjacent rear wheel 16.

The ends of the longest leaf 26 of the leaf spring assembly 10 are formed to include eye portions 28 for attachment by a conventional shackle (not shown) at the rear by a suitable hanger assembly 30 at the front to the outboard side of the adjacent side rail 12.

In accordance with the invention, the leaf 32 adjacent the longest or spring-eye leaf 26 is formed to include the conventional "cut-off V" shaped ends for being positioned adjacent the respective eye portions 28 of the leaf 26, while each progressively smaller leaf 34, 36, 38, 40 and 42 is formed to include ogee or sloped S-shaped ends by being cut from bar stock of a predetermined finished width and thickness and a predetermined multiple leaf spring length, by a die section having the desired ogee or sloped "S" shape. It's apparent that forming in this manner eliminates the production of any scrap material.

As shown in FIGS. 2 and 3, alternate leaves 36 and 40 are stacked at assembly so as to have their ogee-shaped ends reversed with respect to the ogee-shaped ends of the adjacent alternate leaves 34, 38 and 42. The respective lengths are such that each longer longitudinal edge of each successive leaf preferably extends at both ends thereof just past each shorter longitudinal edge of the preceding leaf, producing an alternately stepped configuration.

The leaves 26, 32, 34, 36, 38, 40 and 42 are each bowed and heat treated in the conventional manner prior to assembly. The degree of cambering is such that at assembly each leaf nestles into substantially full length contact with each respective underlying leaf.

A shortest leaf 44 is formed with arcuate or straight ends and is left flat, rather than being bowed like all the other leaves of the assembly, and is mounted on the shortest bowed leaf 42 to serve as a back-up or stop should the other leaves be caused to completely flatten out during an impact or load condition.

All the leaves have an aperture formed at the midportions of their respective lengths for insertion therethrough of a pin or stud 46 (FIG. 1) confined at its ends by the axle 15 and the plate 20, to prevent longitudinal displacement of any leaf during operation. A suitable clamp 48 is mounted around the assembled leaves at a location adjacent one end of the shortest, flat leaf 44 for preventing sideward displacement of any leaf during operation.

As an alternate embodiment the end shape of each leaf 34-42 may be formed in a symetrical ogee or reversed curve configuration 50 (FIG. 4), with the ends of adjacent leaves being oppositely disposed, tending to prevent splaying along one side or the other of any particular leaf.

It should be apparent that the above leaf spring arrangements result in an improved assembly wherein (1) the conventional end rolling and piercing operations, (2) the inclusion of conventional tip inserts of separators and (3) scrap resulting from conventional end shaping operations, are all eliminated, without adversely affecting the operation of the assembly.

While but one embodiment of the invention has been shown and described other modifications are possible.

What is claimed is:

1. A method of manufacturing the intermediate leaves of a vehicle suspension leaf spring structure including a conventional longest bowed leaf and a conventional shortest flat leaf, the method comprising the following steps:
   a. cutting bar stock of a predetermined finished width and thickness and a predetermined multiple leaf spring length into a predetermined number of individual length leaves, having ogee-shaped end cuts and progressively shorter lengths, and concurrently piercing a hole in the longitudinal center of each leaf;
   b. cambering said leaves to predetermined shape;

c. assembling said cambered leaves on said longest bowed leaf such that each successive leaf is shorter than the underlying leaf and its ogee-shaped end is mounted in the oppositely disposed attitude relative to the underlying leaf;

d. mounting said shortest flat leaf on the last assembled and shortest cambered leaf; and e. mounting a bolt through the aligned center holes to prevent longitudinal displacement of said leaves during operational conditions, and mounting a clamp around at least one of the end portions of the assembly adjacent an end of the shortest leaf to prevent lateral displacement of said leaves during operational conditions.

2. A method of manufacturing a vehicle suspension leaf spring structure, the method comprising the following steps:

a. cutting bar stock of a predetermined finished width and thickness and a predetermined multiple leaf spring length into a predetermined number of individual length leaves, the longest leaf, the leaf adjacent thereto, and the shortest leaf having substantially straight end cuts, and the intermediate leaves having ogee-shaped end cuts, and concurrently piercing a hole in the longitudinal center of each leaf;

b. rolling eyes on the ends of the longest leaf;

c. bowing the individual leaves except the shortest leaf to predetermined radii;

d. heat treating the bowed leaves;

e. assembling the leaves such that each successive leaf is shorter than the underlying leaf and its ogee-shaped end is mounted in the oppositely disposed attitude relative to the underlying leaf; and f. mounting a bolt through the aligned center holes and mounting a clamp around at least one of the end portions of the assembly adjacent an end of the shortest leaf such that all leaves in the assembly except the shortest leaf are urged into substantially full length contact with the respective underlying leaves and prevented from longitudinal and lateral displacement during operational conditions.

3. A method of manufacturing a vehicle suspension leaf spring structure, the method comprising the following steps:

a. forming bar stock to a predetermined finished width and thickness and a predetermined multiple leaf spring length;

b. cutting the bar stock into a predetermined number of individual length leaves, the two longest leaves and the shortest leaf having substantially straight end cuts, and the intermediate leaves having reversed curve-shaped end cuts, and concurrently piercing a a center hole therein;

c. rolling eyes on the ends of the longest leaf;

d. cambering the individual leaves except the shortest leaf to predetermined shape;

e. heat treating the cambered leaves;

f. assembling the leaves such that each successive leaf is shorter than the underlying leaf and its reversed curve-shaped end is mounted in the oppositely disposed attitude relative to the underlying leaf; and g. mounting a bolt through the aligned center holes and mounting a clamp around at least one of the end portions of the assembly adjacent an end of the shortest leaf such that all leaves in the assembly except the shortest leaf are urged into substantially full length contact with the respective underlying leaves and prevented from longitudinal and lateral displacement during operational conditions.

4. A vehicle suspension leaf spring structure comprising a plurality of superimposed longitudinally cambered spring leaves, each being in substantially full length contacting relationship with each successive spring leaf and a predetermined increment shorter than the underlying spring leaf, said spring leaves having end portions formed in an ogee-shaped configuration, with adjacent spring leaves having their respective ogee-shaped configuration oppositely disposed, aligned apertures formed in each of said spring leaves at the midpoint of the respective lengths thereof, pin means mounted in said apertures to prevent longitudinal displacement of said leaves during operational conditions, and clamp means mounted around said superimposed leaves to prevent lateral displacement of said leaves during operational conditions.

5. A vehicle suspension leaf spring structure comprising a plurality of superimposed longitudinally bowed spring leaves including a longest leaf having eyes for mounting formed on both ends thereof, a second leaf mounted on said longest leaf and having substantially straight end portions formed thereon and positioned adjacent said respective mounting eyes, and a plurality of intermediate leaves, each being a predetermined increment shorter than the underlying leaf and having end portions formed in an ogee-shaped configuration, with adjacent leaves having their respective ogee-shaped configuration oppositely disposed, each of said leaves being in substantially full length contacting relationship with each successive leaf; a shortest flat leaf having one of arcuate or straight end portions formed thereon and being mounted on the shortest of said bowed intermediate leaves; aligned, longitudinally-centered apertures formed in each of said spring leaves; pin means mounted in said apertures to prevent longitudinal displacement of said leaves during operational conditions; and clamp means mounted around said superimposed bowed leaves and said shortest flat leaf adjacent one end of said shortest flat leaf to prevent lateral displacement of said leaves during operational conditions.

* * * * *